United States Patent
Menzel

(10) Patent No.: US 8,992,663 B2
(45) Date of Patent: Mar. 31, 2015

(54) METHOD FOR THE SIMULTANEOUS PRODUCTION OF IRON AND A CRUDE SYNGAS CONTAINING CO AND $H_2$

(75) Inventor: Johannes Menzel, Waltrop (DE)

(73) Assignee: ThyssenKrupp Uhde GmbH, Dortmund (DE)

( * ) Notice: Subject to any disclaimer, the term of this patent is extended or adjusted under 35 U.S.C. 154(b) by 408 days.

(21) Appl. No.: 13/322,188

(22) PCT Filed: May 5, 2010

(86) PCT No.: PCT/EP2010/056083
§ 371 (c)(1),
(2), (4) Date: Dec. 6, 2011

(87) PCT Pub. No.: WO2010/136306
PCT Pub. Date: Dec. 2, 2010

(65) Prior Publication Data
US 2012/0079917 A1  Apr. 5, 2012

(30) Foreign Application Priority Data
May 25, 2009  (DE) .......................... 10 2009 022 510

(51) Int. Cl.
| | |
|---|---|
| *C21B 5/00* | (2006.01) |
| *C01B 3/02* | (2006.01) |
| *C01B 3/34* | (2006.01) |
| *C01B 3/48* | (2006.01) |
| *C10K 1/00* | (2006.01) |
| *C10K 1/02* | (2006.01) |
| *C10K 3/04* | (2006.01) |
| *C10K 3/06* | (2006.01) |
| *C21B 7/00* | (2006.01) |
| *C21B 5/02* | (2006.01) |

(52) U.S. Cl.
CPC ................. *C21B 5/001* (2013.01); *C01B 3/348* (2013.01); *C01B 3/48* (2013.01); *C01B 2203/0216* (2013.01); *C01B 2203/0222* (2013.01); *C01B 2203/0255* (2013.01); *C01B 2203/043* (2013.01); *C01B 2203/148* (2013.01); *C10K 1/004* (2013.01); *C10K 1/02* (2013.01); *C10K 3/04* (2013.01); *C10K 3/06* (2013.01); *C21B 5/003* (2013.01); *C21B 5/026* (2013.01); *C21B 7/002* (2013.01); *C21B 2100/02* (2013.01); *C21B 2100/04* (2013.01)

USPC ........................................... 75/460

(58) Field of Classification Search
CPC .. C21B 2100/02; C21B 2100/04; C21B 5/06; C21B 7/002; C21B 5/001; C22B 5/10; B01D 2257/504; B01D 53/62; C01B 3/348; C01B 3/48; C01K 1/004; C01K 1/02; C01K 3/04; C01K 3/06
USPC ..................... 75/468, 464, 460, 465
See application file for complete search history.

(56) References Cited

U.S. PATENT DOCUMENTS

| | | | | |
|---|---|---|---|---|
| 1,357,781 | A | * | 11/1920 | Koppers ........................... 75/380 |
| 2,715,575 | A | | 8/1955 | Coutant |
| 4,013,454 | A | * | 3/1977 | Jordan ............................. 75/468 |
| 4,317,677 | A | | 3/1982 | Weber et al. |
| 4,917,727 | A | * | 4/1990 | Saito et al. ....................... 75/460 |
| 6,045,602 | A | * | 4/2000 | Shah et al. ....................... 75/466 |

FOREIGN PATENT DOCUMENTS

| | | |
|---|---|---|
| EP | 0 209 880 | 1/1987 |
| KR | 2001-0062899 | 7/2001 |
| KR | 2003-0054939 | 7/2003 |

OTHER PUBLICATIONS

International Search Report of PCT/EP2010/056083, Aug. 11, 2010.
Sköld B-E, "ULCOS, the European initiative for $CO_2$-lean steelmaking," Newsletter from MEFOS, Lulea, Sweden, Dec. 1, 2006, pp. 1-4, XP002560413.

* cited by examiner

*Primary Examiner* — George Wyszomierski
*Assistant Examiner* — Tima M McGuthry Banks
(74) *Attorney, Agent, or Firm* — Collard & Roe, P.C.

(57) ABSTRACT

The invention relates to a method for simultaneously producing iron and a crude syngas containing CO and $H_2$ by means of a blast furnace that is charged with iron ore and carbon-containing reducing agents. The amount of carbon-containing reducing agents fed to the blast furnace is greater than the amount of fuel required for producing the iron. Technically pure oxygen is fed into the blast furnace for the blast furnace process and for producing the crude syngas. In addition, $CO_2$ and/or steam are fed to the blast furnace in order to control the ratio between CO and $H_2$ in the crude syngas discharged from the blast furnace as top gas and/or moderate the temperature at which the oxygen is injected.

6 Claims, No Drawings

METHOD FOR THE SIMULTANEOUS PRODUCTION OF IRON AND A CRUDE SYNGAS CONTAINING CO AND H₂

CROSS REFERENCE TO RELATED APPLICATIONS

This application is the National Stage of PCT/EP2010/056083 filed on May 5, 2010, which claims priority under 35 U.S.C. §119 of German Application No. 10 2009 022 510.2 filed on May 25, 2009. The international application under PCT article 21(2) was not published in English.

The invention relates to a method for the simultaneous production of iron and a crude synthesis gas that contains CO and $H_2$.

Synthesis gases are gas mixtures that are used in synthesis reactions and consist predominantly of carbon monoxide and hydrogen. For some $CO/H_2$ combinations, special designations such as water gas, cracked gas, methanol synthesis gas, or oxo gas have established themselves, based on their origin or their use. Synthesis gas can serve as a starting substance mixture for the production of liquid fuels. For example, synthesis gas is used in the Fischer-Tropsch process, to produce diesel fuel. Gasoline fuels can be produced using the MTG (methanol to gasoline) process, in which the synthesis gas is first converted to methanol, which is later converted to gasoline, in further method steps.

Fundamentally, all carbonaceous substances can be used for synthesis gas production. These include not only the fossil fuels coal, petroleum, and natural gas, but also other starting materials such as plastics, peat, wood or other biomass, such as municipal or agricultural wastes, for example. If solids are used, these must first be shredded, in complicated manner, so that a crude synthesis gas can be produced by means of partial oxidation or steam cracking. Afterwards, the crude synthesis gas is processed in further steps. All of these measures lead to high investment costs, which are a barrier for the production of liquid fuels from synthesis gas.

A method for the simultaneous production of iron and methanol or ammonia is described in U.S. Pat. No. 4,013,454. Iron ores, carbonaceous reduction agents, and a fuel gas composed of oxygen and $CO_2$ are supplied to a blast furnace. A furnace gas that contains approximately 80% CO and 20% $CO_2$ occurs in blast furnace processes. The furnace gas is processed by means of chemical reactions as well as adsorption procedures, to produce a synthesis gas that can be used for a methanol process or an ammonia process. The conversion of the furnace gas, which consists essentially of CO and $CO_2$, to produce a synthesis gas that is suitable for the methanol process or ammonia process, requires multiple additional method steps and, accordingly, additional investments.

It is the task of the present invention to reduce not only the investment costs but also the operating costs for synthesis gas production, and to improve the $CO_2$ balance.

The object of the invention and the solution for this task is a method for the simultaneous production of iron and a crude synthesis gas that contains CO and $H_2$, using a blast furnace that is charged with iron ores and carbonaceous reduction agents, whereby the amount of carbonaceous reduction agents supplied to the blast furnace is greater than the amount of fuel required for iron production, whereby technically pure oxygen is supplied to the blast furnace, for the blast furnace process and for production of the crude synthesis gas, and whereby in addition, $CO_2$ and/or steam is/are supplied to the blast furnace, in order to control the $CO/H_2$ ratio of the crude synthesis gas that leaves the blast furnace as furnace gas, and/or in order to moderate the blow-in temperature of the oxygen injection.

In general, the blast furnace is charged from above, layer by layer, with ore and coke. The fill material slips downward into hotter and hotter zones of the blast furnace. Oxygen is blown in, in the lower part of the blast furnace. As a result, part of the carbonaceous reduction agent burns to form carbon monoxide and carbon dioxide, which rise into the bulk ore material. The iron ore is reduced to metallic iron by the rising gases and the hot carbonaceous reduction agent. According to the invention, an additional amount of carbonaceous reduction agent is supplied to the blast furnace, as compared with pure iron production. This additional amount can be supplied in the form of coke, coal, oil, plastics, natural gas, recycled gases, coke oven gas, or waste gas, in order to maximize the production of the crude synthesis gas amount. The oxygen amount is adapted to the fuel amount, and is also greater than the amount required for pure iron production. The blast furnace process is conducted, according to the invention, in such a manner that the furnace gas already contains CO and $H_2$ in an amount ratio that corresponds to the desired synthesis gas composition, or at least comes close to it. Furthermore, the blast furnace process is preferably conducted in such a manner that the $CO_2$ proportion of the crude synthesis gas, which is drawn off as furnace gas, is low. To control the $CO/H_2$ proportion, $CO_2$ and/or steam is/are additionally supplied to the blast furnace. The carbon dioxide can react with the coke to produce carbon monoxide: $C+CO_2 \rightarrow 2\ CO$. Furthermore, carbon dioxide can be used for reacting with hydrogen, to form carbon monoxide and steam: $CO_2+H_2 \rightarrow CO+H_2O$. If steam is also added as an additional component, to control the $CO/H_2$ content of the furnace gas that leaves the blast furnace, the steam can react with coke, at the high temperatures in the blast furnace, to produce carbon monoxide and hydrogen: $C+H_2O \rightarrow CO+H_2$. Furthermore, the steam can also be used for converting carbon monoxide to carbon dioxide: $CO+H_2O \rightarrow CO_2+H_2$.

Using the method according to the invention, it is possible to produce a synthesis gas that meets specifications, in clearly more cost-advantageous manner, because an existing system for iron production is used. The operating costs are also loser, in the simultaneous production of synthesis gas and iron according to the invention, because the major portion of the supplied fuel is already needed for iron production. The $CO_2$ balance is clearly more advantageous, as compared with conventional methods. Two products are produced, at the same time, from the supplied fuel. Because the furnace gas is used as a crude synthesis gas, not only iron but also additional valuable materials can be produced. The furnace gas is not only utilized thermally, to preheat a combustion gas, but also it is utilized in terms of its material, and forms the starting substance for other products, such as, for example, diesel, gasoline, or methanol. As compared with a conventional blast furnace process, only a slight additional demand for fuel is necessary. This is clearly lower than the sum of fuel for methods operated separately. As a return for the additional fuel demand, one obtains an additional valuable material, for example diesel fuel, for which approximately the same amount of coal would have had to be gasified in the case of conventional production by means of coal gasification.

High reaction temperatures in the blast furnace can be achieved by means of operation of the blast-furnace process with technically pure oxygen. This makes it possible to do without pre-heating of the oxygen. A higher yield of synthesis gas is achieved by means of the use of technically pure oxygen for the production of the crude synthesis gas, because in contrast to the conventional method of operation with air pre-heating, the consumption of furnace gas for pre-heating is eliminated. If pre-heating of the oxygen is nevertheless required, the amount of the furnace gas required for this is less than in the case of the conventional blast-furnace process, because the oxygen stream to be heated is much smaller than an air stream that additionally contains nitrogen. When using pure oxygen, the crude synthesis gas produced furthermore does not contain any nitrogen. This significantly facilitates further processing, because complicated nitrogen separation is eliminated. Finally the $CO_2$ balance of the blast-furnace process is also improved by means of the use of pure oxygen, because no furnace gas is lost for air pre-heating. In the case of a conventional blast-furnace process, approximately one-third of the furnace gas is needed for air pre-heating, and is reacted to $CO_2$ during this process. In the case of the oxygen-guided process according to the invention, this amount is additionally available as synthesis gas and can be used for the production of valuable materials.

Another embodiment of the method according to the invention provides that substances that minimize the sulfur content in the crude synthesis gas are supplied to the blast furnace. For this purpose, calcium carbonate is preferably supplied, together with the iron ore.

According to another advantageous embodiment of the method according to the invention, part of the crude synthesis gas is recirculated into the blast furnace. The crude synthesis gas contains carbon monoxide, which in turn serves as a reduction agent for the iron ore.

Dust is removed from the crude synthesis gas that leaves the blast furnace as furnace gas, and it can then be used as a valuable material. If the crude synthesis gas that occurs as furnace gas does not yet have a $CO/H_2$ ratio that is in accordance with specifications, it is possible to mix carbon monoxide and/or hydrogen from external sources into the blast-furnace gas, or to react the crude synthesis gas by means of CO conversion, with the addition of steam, to produce $H_2$ and $CO_2$. In this way, the $CO_2$ supplied to the blast furnace can also be obtained from the crude synthesis gas that leaves the blast furnace. It is practical if the $CO_2$ supplied to the blast furnace is obtained from the crude synthesis gas that was subjected to CO conversion.

An advantageous embodiment of the method according to the invention provides that at least part of the crude synthesis gas is reacted by means of CO conversion, with the addition of steam, to produce hydrogen and $CO_2$, and that hydrogen is obtained in a subsequent pressure change adsorption system (Pressure Swing Adsorption—PSA system), whereby an exhaust gas stream rich in $CO_2$ is recirculated back into the blast furnace, for temperature moderation, from the pressure change adsorption system. In particular, the exhaust gas stream, which is rich in $CO_2$, from the pressure change adsorption system can be used for cooling the oxygen injection.

In the case of a particularly advantageous method variant, a crude gas that contains hydrogen is produced in a coke oven, which gas is mixed into the blast-furnace gas. In this connection, it proves to be advantageous to first purify the coking facility gas and to undertake separation of the hydrogen from the residual gas. The hydrogen stream can then be metered into the furnace gas extracted from the blast furnace, in targeted manner. This coordinated synthesis gas production from a blast-furnace process and a coke oven process proves to be particularly advantageous, because a crude gas rich in carbon monoxide is produced in the blast furnace, and a crude gas rich in hydrogen is produced in the coke oven. The two processes complement one another in synthesis gas production. Furthermore, most coking facilities are situated in the vicinity of blast furnaces, because coke is needed for the blast-furnace process.

A coal gasification system, a natural gas PDX, an autothermal reformer, or a steam reformer can also serve as an external hydrogen source. Also, a second blast furnace can be set up for hydrogen production, by means of a targeted method of operation.

Another advantage of the invention consists in that the synthesis gas of several blast furnaces can be brought together, for example if multiple blast furnaces are situated at one location or in the vicinity of a location, and that the further synthesis and product processing can be carried out on a larger scale, i.e. on a refinery scale, and thus more cost-advantageously, in total. Possibly, the processing can also be carried out in an existing refinery. Additional facilities that produce synthesis gas, such as, for example, coal gasification systems, gasification systems using renewable raw materials, and the like can be integrated into the total complex, in cost-advantageous manner.

The crude synthesis gas produced using the method according to the invention can be used in different production methods. For example, it can be used for the production of fuels, within the scope of a Fischer-Tropsch process. Likewise, it can be used within the scope of methanol synthesis. The methanol can then be converted to gasoline, according to the MTG process. Also, it is possible that the synthesis gas is converted to SNG. Likewise, the synthesis gas that is produced can be used for oxo synthesis or for ammonia production.

The invention claimed is:

1. Method for the simultaneous production of iron and a crude synthesis gas that contains CO and $H_2$, using a blast furnace that is charged with iron ores and coke,
   wherein an amount of coke supplied to the blast furnace is greater than an amount of fuel required for iron production in order to maximize the production of the crude synthesis gas amount,
   wherein technically pure oxygen is supplied to the blast furnace, for a blast furnace process and for production of the crude synthesis gas, an amount of the oxygen being adapted to the fuel amount and also being greater than an amount required for pure iron production,
   wherein in addition, $CO_2$ and/or steam is/are supplied to the blast furnace, in order to control a $CO/H_2$ ratio of crude synthesis gas that leaves the blast furnace as furnace gas.

2. Method according to claim 1, wherein substances for reducing sulfur content in the crude synthesis gas are supplied to the blast furnace.

3. Method according to claim 1, wherein part of the furnace gas is recirculated back into the blast furnace.

4. Method according to claim 1, wherein dust is removed from the crude synthesis gas that leaves the blast furnace as furnace gas.

5. Method according to claim 1, wherein the $CO_2$ supplied to the blast furnace is obtained from the crude synthesis gas that leaves the blast furnace.

6. Method according to claim 1, wherein at least part of the crude synthesis gas is reacted by CO conversion, with addition of steam, to produce $H_2$ and $CO_2$, and hydrogen is obtained in a subsequent pressure change adsorption system, and
   wherein an exhaust gas stream rich in $CO_2$ is recirculated back into the blast furnace for temperature modification, from the pressure change adsorption system, so that the $CO_2$ supplied to the blast furnace is obtained from the crude synthesis gas that was reacted by CO conversion.

* * * * *